United States Patent [19]

Scala et al.

[11] Patent Number: 4,664,768
[45] Date of Patent: May 12, 1987

[54] REINFORCED COMPOSITES MADE BY ELECTRO-PHORETICALLY COATING GRAPHITE OR CARBON

[75] Inventors: Luciano C. Scala, Murrysville Boro, Pa.; Timothy J. Fuller, Berkeley Heights, N.J.; William M. Alvino, Penn Hills, Pa.

[73] Assignee: Westinghouse Electric Corp., Pittsburgh, Pa.

[21] Appl. No.: 717,046

[22] Filed: Mar. 28, 1985

[51] Int. Cl.$^4$ .................... C25D 13/06; C25D 13/12
[52] U.S. Cl. ........................... 204/181.6; 156/151; 156/307.4; 156/307.5; 428/229; 428/408
[58] Field of Search ............ 204/181.4, 181.6; 428/290, 407, 408, 196, 229; 156/151, 150, 307.4, 307.5

[56] References Cited

U.S. PATENT DOCUMENTS

| | | | |
|---|---|---|---|
| 3,706,614 | 12/1972 | Kirkpatrick et al. | 156/151 |
| 4,272,346 | 6/1981 | Jakubowski et al. | 204/181.4 |
| 4,327,143 | 4/1982 | Alvino et al. | 156/307.5 |
| 4,329,387 | 5/1982 | Goodrich et al. | 428/408 |
| 4,391,933 | 7/1983 | Scala et al. | 204/181.6 |
| 4,395,514 | 7/1983 | Edelman | 428/408 |
| 4,539,253 | 9/1985 | Hirschbuehler et al. | 428/229 |
| 4,590,539 | 5/1986 | Sanjana et al. | 156/307.4 |

OTHER PUBLICATIONS

Subramanian et al., Proc. 33rd Ann. Conf. Reinforced Plastics/Compos. Intst., Soc. Plast. Ind., (1978), Section 20—F, pp. 1–8.

Primary Examiner—Howard S. Williams
Attorney, Agent, or Firm—R. D. Fuerle

[57] ABSTRACT

Disclosed is a method of making a laminate by electrophoretically coating a flat mat made from a material selected from graphite, carbon, and mixtures thereof with an electrophoretable polymer in a non-aqueous system. The polymer is cured and the mat is impregnated with a thermosetable impregnating resin. The impregnating resin is B-staged to form a prepreg and several prepregs are stacked and cured under heat and pressure to form the laminate. Also disclosed is a laminate made by this method.

12 Claims, 1 Drawing Figure

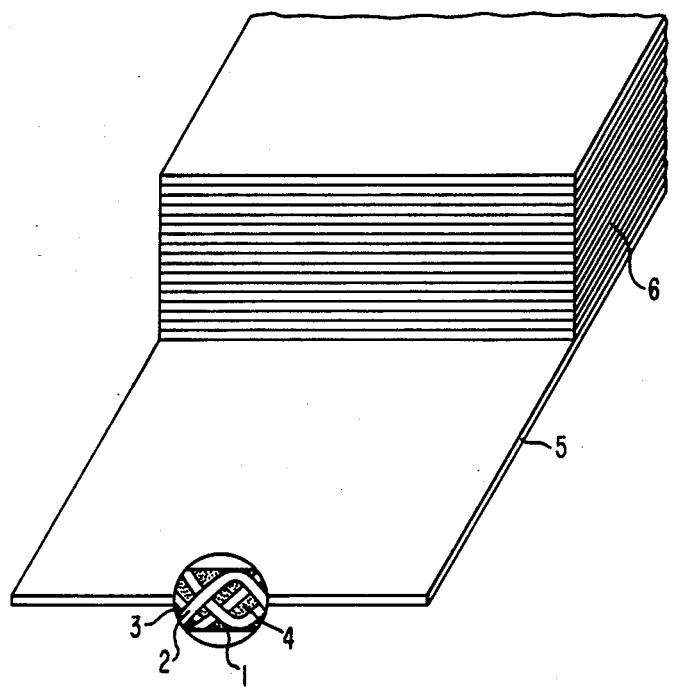

REINFORCED COMPOSITES MADE BY ELECTRO-PHORETICALLY COATING GRAPHITE OR CARBON

BACKGROUND OF THE INVENTION

The strongly adherent, flaw-free coatings obtained by electrophoretic depositions (EPD) of certain types of polymers have been found to be useful as primers on graphite or carbon reinforcing materials to provide uniform, thin films that yield excellent adhesion and corrosion protection. This type of film has also been investigated as a primer coating for an adhesive joint between metals. An attempt was also made to obtain improved mechanical properties for graphite fiber-epoxy composites when selected electrophorettable resins were electrodeposited onto the surface of the fibers to form an interphase layer between the fiber and the resin matrix. (See R. V. Subramanian et al., "Electrodeposition of Polymers on Graphite Fibers on Composite Properties," *Proc. 33rd Ann. Conf. Reinforced Plastics/Compos. Int., Soc. Plast. Ind.* 1978, Section 20-F, pp. 1 to 8.). The basic chemistry system used was a maleic anhydride copolymer deposited anodically from an aqueous system onto the graphite fibers in a continuous coating line. Composites were made using primed fiber-epoxy prepregs which were tested in a variety of ways. However the test data indicated that the physical properties of the composites made from graphite fibers onto which the polymers were electrodeposited were not improved as a result of this fiber treatment. In particular, laminate failures occurred because of a lack of adhesion between the impregnating resin and the fibers, or because a chemical graft failed to form between the electrophoretable resin and the fiber, or because a chemical bond between the interphase resin and the matrix resin failed to form. As a result, the interlaminar shear strength of the composite was decreased.

SUMMARY OF THE INVENTION

We have discovered that a laminate made from graphite or carbon where the graphite or carbon is electrophoretically coated with a polymer will have improved interlaminar shear strength if the polymer is deposited from a non-aqueous system. A laminate made according to the process of this invention has superior mechanical properties over an identical laminate where the graphite or carbon supporting material was not electrophoretically coated or was electrophoretically coated from an aqueous system. It was somewhat surprising that improved properties were obtained because electrophoretable polymers are normally coated on metals, which are about two orders of magnitude more conducting than graphite or carbon. Therefore one would not except to obtain a good adherent deposition of an electrophoretable polymer on graphite or carbon simply by using a non-aqueous system.

DESCRIPTION OF THE INVENTION

The accompanying drawing is an isometric view in section of a certain presently preferred embodiment of a lminate made according to the process of this invention.

In the enlargement window of the drawing, a mat 1, made of carbon or graphite fibers 2, has been electrophoretically coated from a non-aqueous system with a polymer 3, impregnated with an impregnating resin 4, and B-staged to form a prepreg 5. The prepregs have been stacked and the impregnating resin cured to the C-stage under heat and pressure to form laminate 6.

In the first step of the process of this invention, a flat sheet or mat made of graphite fibers, carbon fibers, or a mixture of both, is electrophoretically coated with a polymer. Graphite fibers are preferred as they are stronger than carbon fibers. The fibers may be of any size, and the mats formed from the fibers may be woven or simply pressed into a mat. Mats which are a mixture of carbon or graphite fibers and organic polymeric fibers, such as polyamides or polyesters, are also contemplated.

The fibers are electrophoretically coated from a non-aqueous system. The non-aqueous system may be a solution or an emulsion. Since solutions produce only very thin coatings while emulsions produce thicker coatings, it is preferable to coat from an emulsion. The solution is made by dissolving the electrophoretable polymer in a solvent, and the emulsion is made by pouring the electrophoretable polymer into a non-solvent, which forms the discrete phase of the emulsion. Polymers which can be electrophoretically coated from non-aqueous systems include epoxies, phenolics, polyamides, polyimides, polysulfones, polyamide-imides, polyparabanic acids, and modified polystryenes. Polyamide-imides are preferred as they are easy to handle and inexpensive. U.S. Pat. Nos. 4,391,933; 4,425,467; 4,003,812; and 3,676,383, herein incorporated by reference, disclose non-aqueous systems from which various polymers can be electrophoretically coated. Once the graphite or carbon fibers have been electrophoretically coated to the desired thickness, typically about 0.5 to about 1 mil, the fiber mat is removed from the non-aqueous system and is heated to dry and/or cure the polymer. The electrocoated polymer can then be fully cured if desired, but a partial cure is preferably to obtain a better bond to the impregnating resin. The time and temperature required for curing will depend upon the particular polymer used.

In the next step in the process of this invention, the mat is impregnated with a thermosettable impregnating resin. Suitable impregnating resins include epoxies, polyesters, polyamides, phenolic, melamine, and polyimides. An epoxy impregnating resin is preferred as they are very strong and produce a high temperature laminate. It may be desirable, however, to use a impregnating resin which is compatible with the electrophoretable resin so that a good bond is obtained between the two polymers. After the mat has been impregnated with the thermosettable impregnating resin, it is heated to B-stage the resin, i.e., cured so it is no longer tacky but not fully cured, which forms a prepreg. A number of prepregs, typically about 3 to about 10, are then stacked and placed in a press where they are heated under pressure to C-stage or fully cure the impregnating resin. The time, temperature, and pressure will depend upon the particular resin being used and the characteristics desired for the resulting laminate. These are parameters which are well known in the laminating art.

The process of this invention can also be used in coating filaments for producing filament wound structures. The electrophoretically coated filaments can be dipped into a resin before winding, or the structure can be impregnated with a resin after filament winding.

EXAMPLE 1

An electrophoretic cell was prepared which consisted of a glass cylindrical container, a cylindrical nickel screen as a cathode and a graphite rod as an anode fitted centrally into the nickel cathode with a one inch electrode gap between them. Emulsions containing various electrophoretable polymers were prepared. A graphite anode was immersed 1.5" into each emulsion and 100 volts DC were applied for one minute. The graphite anodes were removed from the emulsions and cured with heat for the time and temperature required for the particular polymer coated. In all cases a coating of one to two mils thick was obtained on the graphite anodes which exhibited no flaws, excellent homogeneity, toughness, and adhesion to the graphite. Three commercial polymers were used to coat the graphite: (1) a polyimide solution of 16% solids in N-methyl pyrrolidone (NMP) sold by DuPont Corporation under the trade designation "Pyre ML, RC-5019," (2) a polyamide-imide polymer sold by Amoco Corporation under the trade designation "AI-10HL," and (3) a polyethersulfone sold by ICI America Inc. under the trade designation "Victrex 300." These polymers were formulated with a mixture of solvent and non-solvent to provide electrophoretable emulsions. The composition at these emulsions were as follows.

| Polymer | Solvent | Non-Solvent |
|---|---|---|
| (1) - 10 g | NMP-64g | Acetone - 213 ml. |
| (2) - 0.98 g | NMP-13g | Methylethylketone - 159 ml. |
| (3) - 2.8 g | NMP-62G | Acetone - 280 ml. |

EXAMPLE 2

Ten grams of a solid bisphenol A epoxy resin having an epoxy equivalent weight of about 2500 to about 4000, sold by Shell Corporation under the trade designation "Epon 1009," were dissolved in 125 ml of cyclohexanone and 13 ml of triethylene amine. The mixture was heated at between 80° and 90° C. until a red solution formed after about a half hour. Then 125 ml of additional cyclohexanone was added. The resulting solution was added with stirring to 1400 ml of methylisobutyl ketone to form an emulsion. A filament wound carbon fiber ring which was 6 inches in diameter, ½ inch in width, and ½ inch thick was used as the anode and a steel rod placed 1 inch away was used as the cathode. Electrophoretic deposition was carried out at 300 volts DC for 1.5 minutes. A current decrease from 17 to 14 mA and 1.9 coulombs was measured. The ring was removed from the emulsion and was cured in an oven starting at 50° C. and increasing 25° C. every 30 minutes to 175° C. At the end of the cure the resin coating on the ring was tough, resilient, and showed excellent adhesion to the substrate.

EXAMPLE 3

A five gram solution of the "Pyre ML" polyimide solution was diluted with 25 grams of N-methyl pyrrolidone and 0.4 grams of triethylamine. The solution was heated for 20 minutes between 35° and 40° C. This clear amber solution was poured into 100 ml of acetone to form a milky emulsion. A small piece of type P graphite fabric 0.026 inches thick from Union Carbide Corporation was immersed into the emulsion. One piece was made the anode and the other piece was made the cathode. A potential of 100 volts DC was supplied between them for one minute. The initial current measured was 20 mA but it decreased to 17 mA after a minute. The graphite fabric anode was removed from the emulsion. A white opaque coating had been deposited on the fabric. The coated fabric was dried for 20 minutes at 100° C. and a tough clear amber coating with good adhesion to the fabric was obtained.

EXAMPLE 4

A portion (2.5 g) of a 50% solids solution of a typical, commercial phenol-formaldehyde resin in methanol was dissolved in 50 g of cyclohexanone, and this solution was added to 350 ml of acetonitrile ($CH_3CN$) containing 5 ml of 1-methylimidazole. The resulting fine emulsion was electrophoresed onto aluminum Q panels, at an electrode spacing of 2 inches. After 5 mins at 100 Volts (12 ma to 5 ma) coverage was not complete. After 3 and 5 mins at 300 Volts (initial current: 25 ma), good, smooth, yellowish coatings were obtained. A cure of 0.5 hr at 50° C.+0.5 hr at 100° C., 0.5 hr at 150° C. and 0.5 hr at 200° C. yielded adherent, blister free, smooth coatings, 1.5 mil thick.

We claim:
1. A method of making a laminate comprising:
   (A) electrophoretically coating a flat mat made from a material selected from the group consisting of graphite, carbon, and mixtures thereof, with an electrophoretable polymer selected from the group consisting of epoxies, phenolics, polyamides, polysulfones, polyamide-imides, polyparabanic acid, modified styrenes and mixtures thereof, in a non-aqueous system;
   (B) partially curing said polymer;
   (C) impregnating said flat mat with a thermosettable impregnating resin;
   (D) B-staging said impregnating resin to form a prepreg;
   (E) forming a stack of said prepregs; and
   (F) curing said impregnating resin in said stack to the C-stage under heat and pressure.
2. A method according to claim 1 wherein said material is graphite.
3. A method according to claim 1 wherein said non-aqueous system is an emulsion.
4. A method according to claim 1 wherein said non-aqueous system is a solution.
5. A method according to claim 1 wherein said electrophoretable polymer is polyamide-imide.
6. A method according to claim 1 wherein said thermosettable impregnating resin is selected from the group consisting of polyesters, polyamides, epoxies, and mixtures thereof.
7. A method according to claim 1, wherein said thermosettable impregnating resin is an epoxy.
8. A method according to claim 1, wherein the number of prepregs in said stack is 3 to 10.
9. A laminate made according to the method of claim 1.
10. A method of making a fiber-reinforced structure comprising:
   (A) electrophoretically coating fibers selected from the group consisting of carbon, graphite, and mixtures thereof, with an electrophoretable polymer selected from the group consisting of epoxies, phenolics, polyamides, polysulfones, polyamide- imides, polyparabanic acid, modified polystyrenes, and mixtures thereof, in a non-aqueous system;
(B) partially curing said polymer;
(C) in either order,
   (1) coating said fibers with an impregnating resin, and
   (2) juxtaposing said fibers to form said structure; and
(D) curing said resin and, said polymer.

11. A prepreg comprising a flat mat of fibers selected from the group consisting of graphite, carbon, and mixtures thereof, coated with an electrophoretably deposited polymer in a non-aqueous system, and impregnated with a thermosettable impregnating resin, cured to the B-stage.

12. A laminate comprising a plurality of prepregs according to claim 11, stacked and cured under pressure to the C-stage.

* * * * *